(12) United States Patent
May

(10) Patent No.: US 9,882,304 B2
(45) Date of Patent: Jan. 30, 2018

(54) ENCAPSULATED CONNECTION FOR AN ELECTRONIC SYSTEM

(71) Applicant: Torque And More (TAM) GmbH, Starnberg (DE)

(72) Inventor: Lutz May, Berg (DE)

(73) Assignee: TORQUE AND MORE (TAM) GMBH, Starnberg (DE)

( * ) Notice: Subject to any disclaimer, the term of this patent is extended or adjusted under 35 U.S.C. 154(b) by 0 days.

(21) Appl. No.: 14/995,805

(22) Filed: Jan. 14, 2016

(65) Prior Publication Data

US 2016/0211607 A1 Jul. 21, 2016

(30) Foreign Application Priority Data

Jan. 16, 2015 (EP) ..................................... 15151555

(51) Int. Cl.
*H01R 13/52* (2006.01)
*H01R 13/533* (2006.01)
(Continued)

(52) U.S. Cl.
CPC ......... *H01R 13/5219* (2013.01); *B60G 11/27* (2013.01); *H01R 13/533* (2013.01);
(Continued)

(58) Field of Classification Search
CPC ............... H01R 13/6658; H01R 13/52; H01R 13/5208; H01R 13/5213; H01R 13/5216;
(Continued)

(56) References Cited

U.S. PATENT DOCUMENTS 3,770,878 A 11/1973 Dozier
3,869,563 A * 3/1975 Ocken, Jr. .......... H05K 7/20463
174/524

(Continued)

FOREIGN PATENT DOCUMENTS

EP 0 375 271 6/1990

*Primary Examiner* — Vanessa Girardi
(74) *Attorney, Agent, or Firm* — Fay Kaplun & Mercin, LLP

(57) ABSTRACT

A connection arrangement is for an electrical connection from an interior room of a sealed housing to an outside of the sealed housing. The connection arrangement includes a first connection line, a second connection line, and an interconnecting element. The first connection line is adapted to be electrically coupled to an electric source arranged outside the housing. The second connection line is adapted to be electrically coupled to an electric element arranged in the interior room. The first connection line is configured for being guided through an opening in a wall of the housing into the interior room. An end section of the first connection line and an end section of the second connection line are both electrically and/or mechanically connected to the interconnecting element to establish an electrical connection from the interior room to the outside of the sealed housing. The end section of the first connection line and the interconnecting element are both sealed using a sealing material with respect to the opening in the wall such that the interior room of the housing is sealed with respect to the surroundings of the housing.

7 Claims, 4 Drawing Sheets

(51) Int. Cl.
  *B60G 11/27*    (2006.01)
  *H01R 13/66*    (2006.01)
  *H01R 13/73*    (2006.01)
(52) U.S. Cl.
  CPC ...... *B60G 2600/00* (2013.01); *H01R 13/6658* (2013.01); *H01R 13/73* (2013.01)
(58) Field of Classification Search
  CPC .......... H05K 3/28; H05K 3/284; H05K 3/285; H05K 5/06; H05K 5/065; H05K 5/0095
  USPC ....... 439/283, 76.1; 174/50.5, 520, 521, 527
  See application file for complete search history.

(56) References Cited

U.S. PATENT DOCUMENTS

| | | | |
|---|---|---|---|
| 4,800,732 A | | 1/1989 | Newton |
| 5,061,193 A | * | 10/1991 | Seaman ................. H01R 13/52 439/276 |
| 8,107,207 B2 | * | 1/2012 | Hotchkiss ............... B29C 39/00 174/50 |

* cited by examiner

ENCAPSULATED CONNECTION FOR AN ELECTRONIC SYSTEM

TECHNICAL FIELD

The present invention relates to the technical field of electrical connections, in particular to a connection arrangement for establishing an electrical connection from an interior room of a sealed housing, like e.g. an air spring, to an outside of the sealed housing. Further, the invention relates to an air spring for a vehicle, wherein the air spring comprises such a connection arrangement.

BACKGROUND

Electronic sensor systems have found their way into products that are under air-pressure, like air-springs. In most cases this requires an electrical connection from the outside of the air-tight container to the inside and/or vice versa. These connections are typically used for providing electric power and/or control signals to electric elements and/or actuators housed within the air spring or for transmitting signals from any kind of sensors housed within the air-spring to a monitoring and/or control unit housed outside of the air spring.

Sophisticated air-springs can now be purchased with a height sensor system integrated. In addition, air-springs are on offer with an integrated accelerometer, air-pressure sensor, and temperature sensor, for example. Typically, these air-springs (with integrated sensor-actuator functions) can be referred to as smart air-springs.

A typical air-spring is an elastic and tubal shaped member (also called rubber sleeve), that is sealed air-tight by round shaped lids that close-off the top and the bottom of the sleeve. The bottom lid is called "piston" and is movable with respect to the top lid during operation of the air spring.

Electronic sensor systems are mounted from the inside of the air-spring onto the upper lid or into the bottom piston. The wire connection to the outside world (that connects the air-spring integrated electronics with the air-spring outside world) is then done through a hole that has to be tooled into either the top plate or the piston device of the air-spring. If not sealed in some ways, the compressed air inside the air-spring would escape through this hole.

Typically, some effort has to be spent for isolating the electrical feed-through from the interior of the air spring housing to the exterior though the known existing solutions may not provide satisfying isolation.

Some air-tight connectors have used molten glass to create an insulated and semi-air-tight connection between the individual metal pins (electric connectors) and the housing of the connector itself. The disadvantage of this professional solution is the relative high price and that such connectors need a relative large space to be fitted correctly.

SUMMARY OF THE INVENTION

The present invention relates to a connection arrangement for establishing an electrical connection from an interior room of a sealed housing to an outside of the sealed housing with an improved isolation quality which reduces the amount of gas exchange between the interior room and the exterior.

According to an aspect of the invention, a connection arrangement for establishing an electrical connection from an interior room of a sealed housing to an outside of the sealed housing is provided. The connection arrangement comprises a first connection line adapted to be electrically coupled to an electric source arranged outside the housing, a second connection line adapted to be electrically coupled to an electric element arranged in the interior room and an interconnecting element. The first connection line is configured to be guided through an opening in a wall of the housing into the interior room. An end section of the first connection line and an end section of the second connection line are both electrically and/or mechanically connected to the interconnecting element in order to establish an electrical connection from the interior room of the sealed housing to the outside of the sealed housing. The end section of the first connection line and the interconnecting element are both sealed by means of a sealing material with respect to the opening in the wall such that the interior room of the housing is sealed with respect to the surroundings of the housing.

The sealed housing may in particular be any volume from which or into which electric power and/or electrical signals must be transmitted by using electric conducting elements. The sealed housing may for example be an interior room of an air spring. Any one of the first and second connection lines may be an electric conductive wire or a stiff or rigid electric conductive element, for example pins made of electric conductive material.

Typically, electric conductive wires comprise a lead and an isolation surrounding the lead in order to avoid an undesired electric connection. In the following, when referring to a wire, it should be understood that such a reference is of exemplary nature only and that the respective examples do also apply to any kind of electric conducting elements having an electric conductive element and an isolator which at least partially surrounds the electric conductive element.

It may be one key concept of the connection arrangement that instead of feeding through an integral wire through an opening of the housing, the wire is cut into two longitudinal parts and the resulting to longitudinal parts are connected again to each other as described above. The end sections of the two longitudinal parts which end sections are located at the cutting zone of the previously integral wire are again electrically connected by using an interconnecting element which does not have any electrical isolation. Said interconnecting element can be located in an opening of the wall of the air tight housing and can be sealed with respect to the housing.

Thus, the risk of gas exchange between the interior room and the surrounding is reduced at least as no gas can leave the interior room through the wire between the isolation and the lead. By cutting a wire into two longitudinal parts and electrically interconnecting these parts by using an interconnecting element, the continuous isolation of the wire is interrupted and a possible gas exchange through such an isolation is avoided as there is no continuous gas exchange channel from the inside to the outside of the housing.

According to an embodiment, the first connection line comprises at least one electrically conductive core, a skinning which is removed at an end of the first connection line and the end of the first connection line is connected to the interconnecting element in order to avoid passing of molecules from the interior room to the outside of the housing or vice versa through an isolation of the first connection line or of the at least one electrically conductive core.

The conductive core may be referred to as a lead and the skinning corresponds to the isolation material surrounding and enclosing the lead. The isolation material is removed at an end section of the first connection line. Thus, the lead does not have any isolation at the end section. The same may apply to the second connection line. The end sections of the connection lines are electrically connected to the interconnecting element. As the interconnecting element and the end sections of the connection lines do not have any electrical isolation any more, there can be no gas exchange through a gas exchange channel provided by a typical wire between the lead and the isolation. However, the interconnecting element and the end sections of the connection lines may require electric isolation and may sealed within a sealing material having electrically isolating characteristics, while the sealing material seals at least the interconnecting element and optionally the end sections of the connection lines with respect to the housing.

Existing sealing materials by means of which a feed through element can be sealed with respect to an opening of the housing can be applied such that a gas exchange from the inside of the housing to the exterior of the housing is reduced almost to zero. Such sealing materials are typically applied in a liquid state and harden in position such that even the smallest gaps are closed by the sealing material.

It has been recognized that when feeding through integral wires and sealing these wires with respect to the housing by using sealing materials, a gas exchange from the interior of the housing to the exterior may be avoided outside of the wire but the isolation material of a wire is typically not arranged that close to the lead that there occurs no gas exchange between the isolation material and the lead of a wire. Therefore, this point may represent the weak point of the air spring's isolation.

According to a further embodiment, the electrically conductive core is a copper core.

According to a further embodiment, the interconnecting element comprises at least one electrically conductive track, wherein the electrically conductive track is adapted for establishing an electrical connection between the first connection line and the second connection line.

The interconnecting element may be a printed circuit board, PCB, to which the end sections of the first and second connection lines are electrically connected. The conductive track is located at a surface or within the PCB and electrically connects the first and second connection line.

According to a further embodiment, the interconnecting element is a circuit board having at least one conduction path for interconnecting the first connection line and the second connection line.

According to a further embodiment, the second connection line comprises at least one electrically conductive core, a skinning which is removed at an end of the second connection line and the end of the second connection line is connected to the interconnecting element in order to avoid passing of molecules from the second connection line to the interconnecting element through an isolation of the second connection line or of the at least one electrically conductive core.

The second connection line can be connected to the interconnecting element similar than the first connection line is. Therefore, the description provided with reference to the first connection line applies in a similar manner to the second connection line and is not repeated here.

According to a further embodiment, wherein by means of the interconnecting element a continuous path from the interior room to the surroundings of the housing, in particular a gap between an insulation of the connection lines and a core of the connection lines is interrupted such that no molecules can pass through gaps in the connection lines from the inside of the housing to the surroundings.

According to a further embodiment, the first connection line and/or the second connection line is soldered to the interconnecting element.

Such a soldering connection does typically not provide a continuous gas exchange channel and does substantially avoid any gas exchange, independent of the location of a surrounding sealing material.

According to a further embodiment, the sealing material is arranged such it surrounds the interconnecting element and at the same time tightly seals the opening in the wall of the housing.

According to a further embodiment, the sealing material is a resin, particularly a resin having a high viscosity in the non-hardened state such that the resin tightly seals the interconnecting element with respect to the opening in the wall of the housing.

According to a further aspect, an air spring for a vehicle is provided, wherein the air spring comprises a connection arrangement as described above and hereinafter.

According to an embodiment, the second connection line is arranged in an interior room of the air spring in order to be connected to a sensor or an actuator and the first connection line is arranged such that it is connected to a control unit and/or a power source arranged outside the air spring housing, such that the control unit and/or the power source can establish a connection in order to provide power or to transmit and/or receive control signals to and from the actuator and sensor, respectively via the connection arrangement.

According to a further embodiment, the interconnecting element is arranged such that it is sealed by means of the sealing material with respect to a hole for leading through the first connection line through a wall of the air spring, wherein the sealing material seals the interior room of the air spring.

According to a further embodiment, the wall of the housing comprises a cavity and the opening in the wall is arranged in the cavity, particularly at the bottom surface of the cavity, wherein the interconnecting element is at least partially arranged within the cavity and wherein the sealing material is at least partially arranged within the cavity.

According to a further embodiment, the air spring comprises a housing which is substantially gas-tight and/or water-tight.

The medium inside of the container (air spring) can be air or any other gas, which is why the here described connector solution can be called "air-tight" or "gas-tight" connection. In the gas tight container there may be a higher or a lower pressure than the pressure outside of the gas tight container. The air-tight connection solution described here is not only valid for electrical signals.

This solution can be used for other types of connections as well, for example optical signal channels where a fluid channel may exist between in inner core of the wire and an outer isolation of the wire. The here described electrical connection design can also be used on water (liquid) tight containers (not only on a gas tight container). If used in space (satellites, for example), the electrical power supply and the signal processing system may be inside the satellite or the space shuttle, for example. The satellite itself is now the gas-tight container and the space is the place where the sensor modules and actuator modules will be placed (related to the pressure difference, this is the reversed situation in comparison to an air-spring).

An aspect of the invention may be described in other words as follows:

The micro surface-cracks and slight unevenness of solid substances can be sealed best when using liquid material that solidifies after having got some time to fill these micro surface cracks. However, it has been recognised that using insulated copper wires may be disadvantageous because gas molecules may still escape within the copper wire insulation, i.e., through a continuous channel or gap between the lead and the isolation material of the wire. Therefore a gas-blocking barrier is used in the electric signal passage (connection) of the here described solution, wherein the gas-blocking barrier is substantially established by cutting an integral wire in two longitudinal parts and removing parts of the isolation at the end sections of the resulting two copper wires and finally connecting the free ends of the wires at the cutting zone by means of an interconnecting element. Thus, the gap or gas exchange channel within the copper wire is interrupted and a gas exchange rate between the interior of the housing and the exterior is substantially reduced.

For producing an electric connection according to the principles presented above, the following steps may be carried out: A small hole is drilled into the gas-tight container and a short insulated copper wire is subsequently passed through the hole from the outside to the inside of the gas-tight container. The inside end of the short insulated copper wire is then soldered (or crimped) onto a small printed circuit board. Optionally, the inside end may be partially freed from the isolation surrounding it. The electrical connection is then going for a few millimeters within the small PCB. Then a second insulated copper wire is soldered (or crimped) to the other end of the small PCB. Optionally, the end of the second insulated copper wire is at least partially freed from the isolation surrounding it. The small PCB and the small hole in the gas-tight container is then sealed (submerged) using resin casting material.

It should be noted that instead of using an integral wire which is cut into two longitudinal parts, two separate wires may be used and the same result may be achieved.

Thus, a connection arrangement is presented very low in cost and therefore ideal for volume applications. The connection arrangement may be used for pressure differences up-to 30 bars. No mechanical stresses need to be applied to the gas-tight housing when applying this solution.

When trying to mount a traditional connector device, the nuts and bolts that are holding the connector in place have to be tightened very strongly. By doing so, enormous mechanical stresses may be locally applied to the air-tight container which may cause problems later-on (thermal expansions or thermal contractions may lead to cracks in the materials because of high localised mechanical stresses). No special treatment is required when drilling a hole through the gas-tight container wall. Any number of wire connections can be realised this way. There is no need to purchase and stock different type of mechanical connectors: 2 pole, 3 pole, 4 pole, etc). The connection arrangement cannot loosen itself as the resin casting is creating a permanent fit that may not be undone over time (by accident, through vibrations, for example). The connection arrangement fits different shapes in the air-tight housing wall (lid).

In the following, exemplary embodiments of the invention are described with reference to the drawings.

DETAILED DESCRIPTION OF EXEMPLARY EMBODIMENTS

The drawings are schematic and not to scale.

Figure 1:
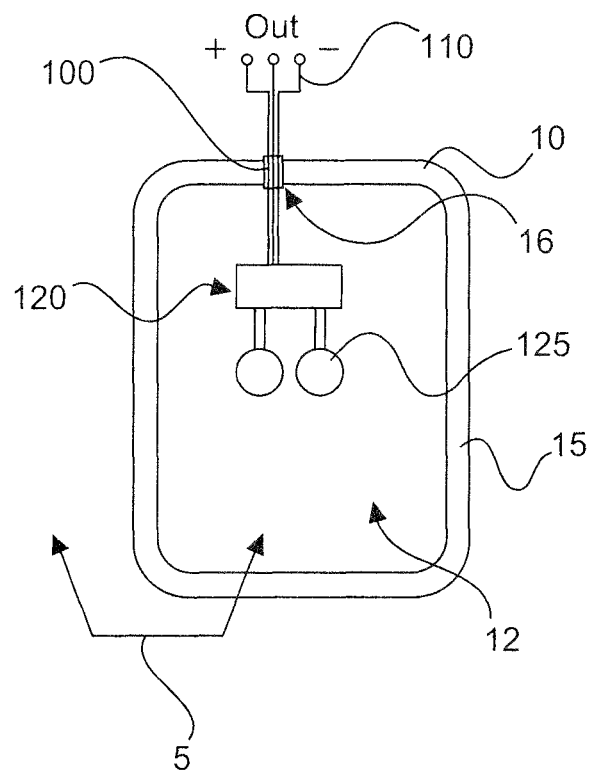
FIG. 1 schematically shows a gas-tight housing with a connection arrangement according to an exemplary embodiment of the invention.

FIG. 1 shows a housing 10, wherein a connection arrangement 100 is arranged in an opening 16 of the wall 15 of the housing and electrically connects an electric element 120 (which may, for example comprising one or more sensors 125) located in the interior room 12 of the housing with a power source or electric source 110 located outside the housing 10. The opening 16 may particularly be a hole or a bore. Additionally or alternatively, the electric component 120 may be connected to a control unit (not shown) which is also located outside the housing. The housing may particularly be substantially gas-tight and/or hermetically sealed, as for example an air spring. In other words, the interior room 12 is sealed with respect to the surroundings of the housing.

A pressure difference between the interior room 12 and the surrounding of the housing is indicated by arrows 5. In order to avoid or substantially reduce gas exchange between the interior room 12 and the surroundings of the housing 10, the opening 16 and the electric connection fed through the opening 16 must be sealed.

Inside of the gas-tight container (housing 10) is placed (in whatever form) a sensor solution 125 (or actuator solution), and the accompanying electronics 120. The electronics is powered from the outside of the gas tight container and also the output signals (and optionally the control lines) have to be passed-through the container housing to the outside. This requires a gas-tight electrical connection from the interior room 12 to the outside of the housing.

As written above, the housing 10 may represent an air spring. Electronic sensor systems have found their way into products that are under air-pressure, like air-springs. In most cases this requires an electrical connection from the outside of the air-tight container to the inside and back again (power supply, signals, controls). Such a connection can be advantageously established by using a connection arrangement as described herein.

Figure 2:
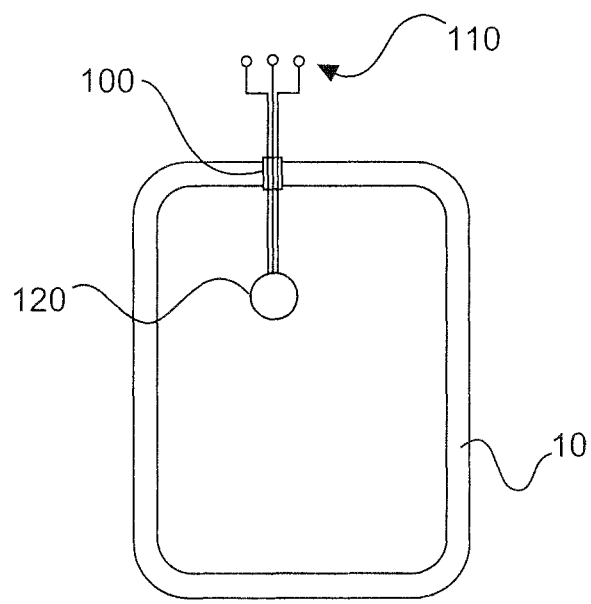
FIG. 2 schematically shows a gas-tight housing with a connection arrangement according to an exemplary embodiment of the invention.

FIG. 2 shows an alternative embodiment of the arrangement shown in FIG. 1.

The here described gas-tight connection solution can also be used when only the sensing module or the actuator module (without further electronics systems) needed is placed inside the gas-tight container.

Figure 3:
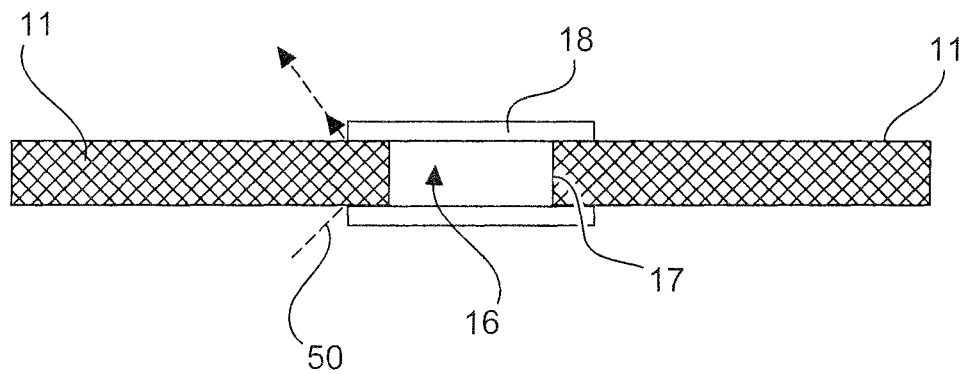
FIG. 3 schematically shows the process of gas escape through a recess of a housing.
Figure 4:
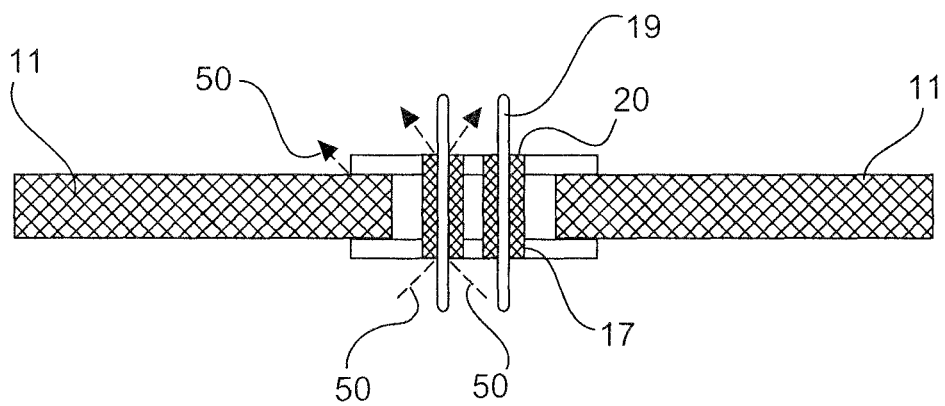
FIG. 4 schematically shows the process of gas escape through a wire.
Figure 5:
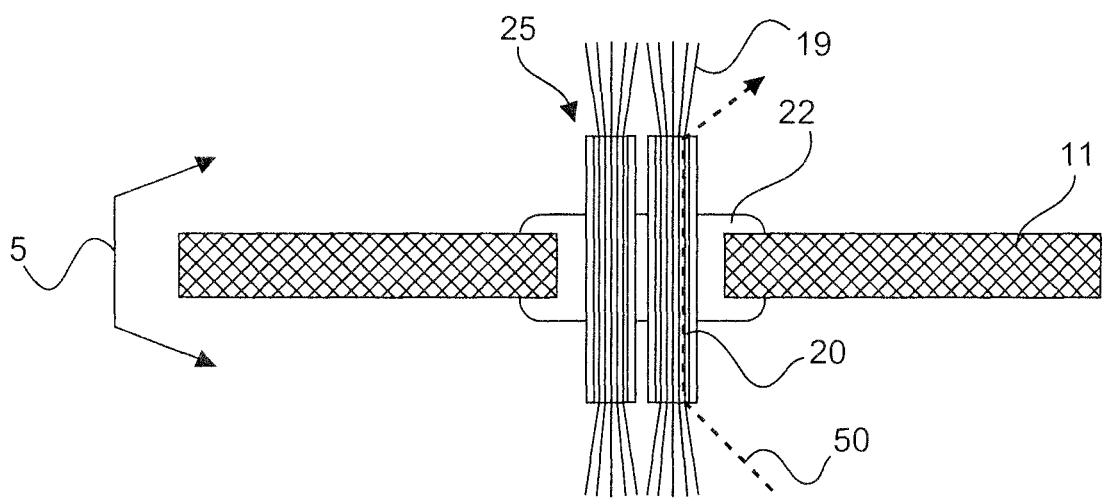
FIG. 5 schematically shows the process of gas escape through a wire with multiple leads.

Reference is now made to FIGS. 3 to 5 in order to describe in more detail the problem of undesired gas exchange between the interior room of the housing and the exterior. In these figures, a wall 11 of a housing is generally shown, wherein the wall 11 has an opening 16 which is isolated by using an isolation element like one or more cover elements 18 and/or an adhesive, like a two-component adhesive 22 for closing the opening 16. Gas molecules are very small in size and find easily their way through small surface cracks and small gaps 17 (uneven surface shapes) that exist when two substances meet (like when plastic material meets metal, for example). The escaping gas molecules are indicated with reference numeral 50.

As can be seen in FIG. 3, even when two objects like the cover 18 and the walls 11, are tightly pressed together, under most circumstances small non-homogeneities in the surface-structure and fine cracks in the surface of the material itself allows small gas molecules to escape. The gas pressure difference (indicated in FIG. 5 by reference numeral 5) between the inside and the outside of the housing defines how much gas will escape in what time. The higher the pressure difference may be, the more gas will escape typically.

Electric connectors (plugs) that mechanically need to be mounted into the housing wall of the gas container suffer from the problem of the remaining micro-gaps (spacing between the connector itself and the gas-tight container walls). But even within (inside) the connector itself, the challenge (of not being truly gas-tight) cannot be easily resolved as the individual electric pins may allow small gas molecules to escape. A theoretically true gas tight electrical connector may also be very expensive (and therefore not suitable for high volume applications).

FIG. 4 shows escaping gas molecules 50 using micro channels 17 (gaps) that exist between the electrical pins 19 and the isolation material 20, and exist between the connector housing itself and the gas container housing.

Even the option of using electric isolated wires and two-component adhesive or resin casting (for example) does not solve the problem as the small gas molecules are now escaping through the inside of the wire isolation itself, as indicated in FIG. 5.

As can be seen in FIG. 5, traditional insulated copper wires 25 may comprise multiple leads 19 which are surrounded by an isolation 20. Such wires 25 may have the disadvantage that small gas molecules can (and will) travel between the individual copper wires or leads 19 (inside of the insulation 20). It does not matter what the cross section (diameter) of the insulated wire may be, astonishing large amounts of gas molecules may escape inside of the wire insulation.

The connection element 100 may be used to overcome these drawbacks by avoiding or substantially reducing undesired gas exchange through wires.

Figure 6:
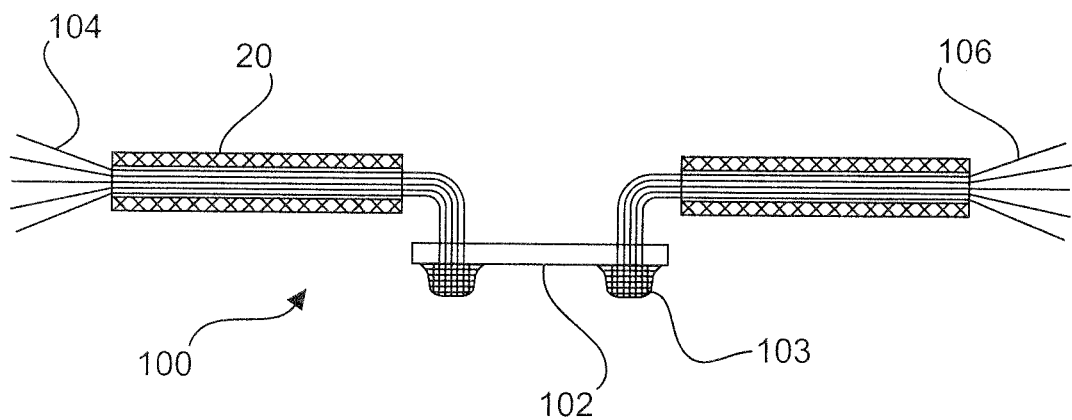
FIG. 6 schematically shows a connection arrangement according to an exemplary embodiment of the invention.

FIG. 6 shows a connection element 100. A first connection line 104 is electrically connected to a second connection line 106 by means of an interconnecting element 102 (for example a printed circuit board, PCB), wherein end sections of the first and second connection lines 104, 106 which are connected to the PCB are free of isolation material 20 in order to interrupt a potentially existing gas exchange channel between the isolation material and the leads of the first and second connection lines. In other words, the isolation is removed and the electric connection is re-established by using the interconnecting element 102.

The first connection line 104 and/or the second connection line 106 may be formed as electric conductive pins (which may be described as relatively stiff electric conductive elements) which are attached directly to the interconnecting element 102. The connection pins can be arranged such that an electrical connector, for example a plug, can fit onto it, thus, simplifying the connection process.

The micro surface-cracks and slight unevenness of solid substances can be sealed best when using liquid material that solidify after having got some time to fill these micro surface cracks. However, using insulated copper wires is not possible because gas molecules will still escape within the copper wire insulation. Therefore a gas-blocking barrier is used in the electric signal passage (connection) of the here described solution.

Producing a gas tight electric connection from inside of a gas tight housing to outside of it can be done as follows: A small hole is drilled into the gas-tight container. A short insulated copper wire is then passed through the hole from the outside to the inside of the gas-tight container. The inside end of the short insulated copper wire is then soldered (or crimped) onto a small printed circuit board after removing the isolation from the end section of said wire, wherein the end section may be pretty short, for example one millimeter or a few millimeters. The electrical connection is then going for a few millimeters within the small PCB. Then a second insulated copper wire is soldered (or crimped) to the other end of the small PCB, again after removing some isolation of the end section of the second wire. The small PCB and the small hole in the gas-tight container is then sealed (submerged) using resin casting material. As a result, parasitic and undesired gas escape is substantially avoided or reduced.

Figure 7:
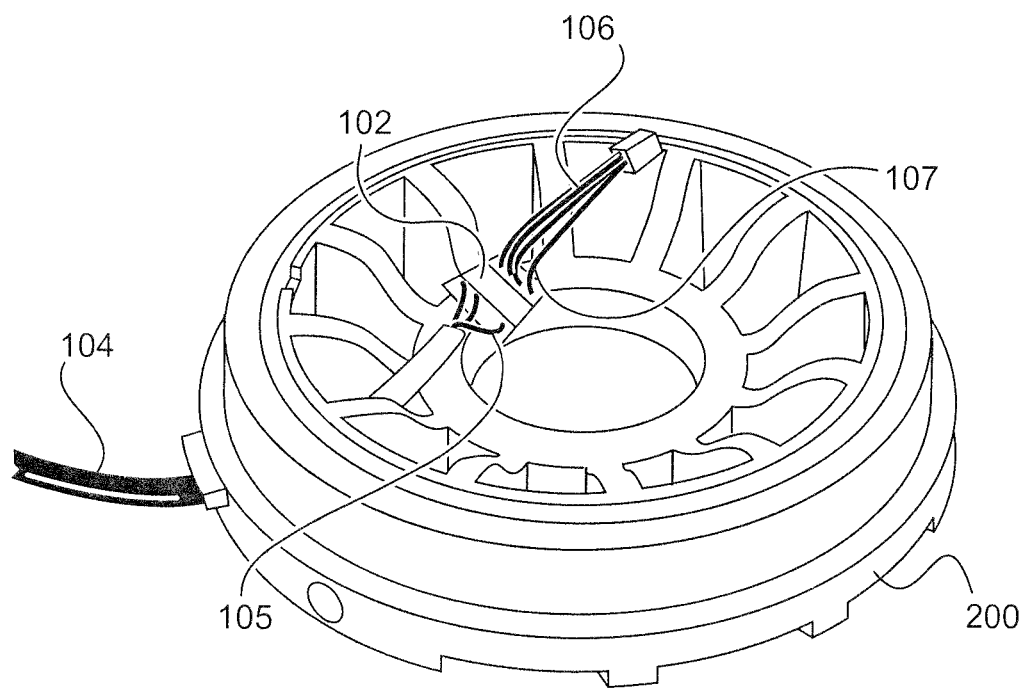
FIG. 7 schematically shows the lid of an air spring with a connection arrangement according to an exemplary embodiment of the invention.
Figure 8:
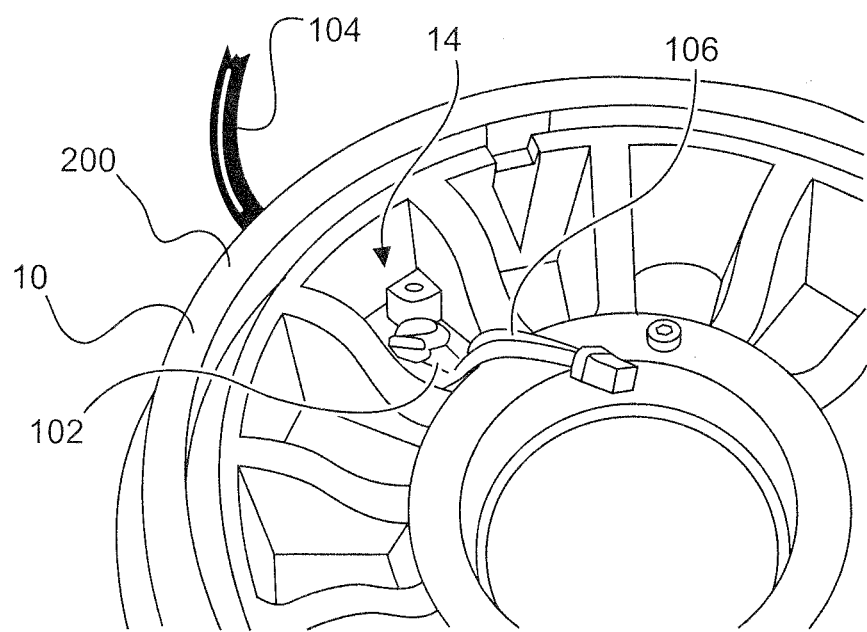
FIG. 8 schematically shows the lid of an air spring with a connection arrangement according to an exemplary embodiment of the invention.
Figure 9:
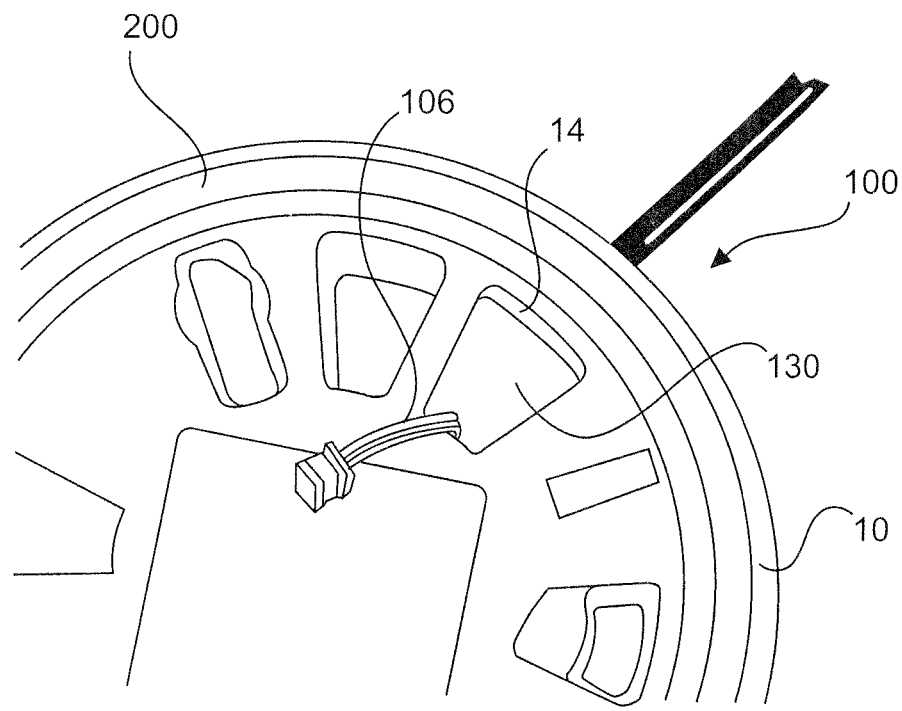
FIG. 9 schematically shows the lid of an air spring with a connection arrangement according to an exemplary embodiment of the invention.

FIGS. 7 to 9 show these steps.

FIG. 7 shows a lid 200 of an air spring. The lid comprises several cavities in which the connection arrangement 100 can be located in. A first connection line 104 is fed through an opening of the lid. The first connection line 104 may comprise multiple wires. The end sections 105 of the wires of the first connection line 104 are electrically connected to the interconnecting element 102 at the interior side of the lid 200. Further, the end section 107 of the second connection line 106 (which may also comprise multiple wires, preferably corresponding to the number of wires of the first connection line) is also connected to the interconnecting element 102.

In other words, a multi wire cable is passed-through a small hole in the lid that is later part of a gas-tight container. In this example it may be an air spring as used in commercial vehicles. The ends of the four cables are then soldered onto a small PCB that has been shaped in such way that the PCB will fit into the cavity where the hole has been made. The four connections are then travelling through the PCB (only a few millimeters are needed) and then another wire system has been soldered onto it.

With reference to FIG. 7 and further to the embodiment described in FIG. 6, it should be understood that the first connection line 104 may be formed as pins and these pins may be fed through the lid 200 in order to enable establishing an electrical connection between a plug and the pins at the outside of the lid 200. Alternatively, the lid may comprise a connection plug (internal connection) to which the pins may be attached and the connection plug internally loops the electronic connection to the outside of the lid to an external connection such that a device can be attached to the external connection of the lid, thus being electrically connected via the external connection and the internal connection to the pins of the first connection line.

Alternatively or additionally, the second connection line 106 may also be formed as connection pins such that the electric element 120 arranged in the interior room 12 can be connected to the pins of the second connection line 106.

FIG. 8 shows the placement of the interconnecting element 102 within a cavity 14 of the lid 200.

FIG. 9 shows the lid 200 after filling sealing material 130 into the cavity. The sealing material preferably completely surrounds the interconnecting element 102. The second connection line 106 can now be used to connect electronic components located within the air spring. The sealing material 130 isolates the opening in the lid 200 and also avoids gas escaping through the isolation material of the wires as there is no continuous channel between the lead and the isolation of the used wires from the inside of the air spring to the outside.

In other words, the cavity is filled with resin casting material (several solutions are available). Preferably, the entire PCB (including the solder joints) is completely submerged into the resin casting material. This solution is air-tight (in the example of an air-spring) up-to 30 bar pressure difference, for example.

LIST OF REFERENCE SIGNS 5 pressure difference
10 housing
11 wall
12 interior room
13 opening
14 recess or cavity
15 wall of the housing
16 opening
17 gaps and surface cracks
18 cover element
19 electrical connection element
20 isolation
22 two-component adhesive
25 wire
50 fluid stream
100 connection arrangement
102 interconnecting element
103 connection point, soldering point
104 first connection line
105 end section
106 second connection line
107 end section
110 electric source
120 electric element
125 sensor
130 sealing material filled into the cavity
200 lid of an air spring

The invention claimed is:

1. A gas-tight housing with an interior room, comprising:
a connection arrangement including:
  a first connection line electrically coupled to an electric source arranged outside the housing, wherein the first connection line extends at least partly outside the housing;
  an interconnecting element arranged within the interior room; and
  a second connection line electrically coupled to an electric element and to the interconnecting element, the electric element being arranged within the interior room, wherein the second connection line extends completely inside the housing;
  wherein the first connection line is guided through an opening in a wall of the housing into the interior room;
  wherein an end section of the first connection line and an end section of the second connection line are both electrically and mechanically connected to the interconnecting element in order to establish an electrical connection from the interior room of the housing to the outside of the housing;
  wherein the end section of the first connection line and the interconnecting element are both sealed with respect to the opening in the wall using a sealing material such that the interior room of the housing is sealed with respect to the surroundings of the housing; and
  wherein the end section of the second connection line is embedded within the sealing material and the remainder of the second connection line is not embedded in the sealing material.

2. An air spring for a vehicle, comprising:
a housing with an interior room;
an electric element arranged in the interior room; and
a connection arrangement including:
  a first connection line configured to be electrically coupled to an electric source arranged outside the housing, wherein the first connection line extends at least partly outside the housing;
  an interconnecting element arranged within the interior room; and
  a second connection line configured to be coupled to the electric element and the interconnecting element, wherein the second connection line extends completely inside the housing;
  wherein the first connection line is configured to be guided through an opening in a wall of the housing into the interior room;
  wherein an end section of the first connection line and an end section of the second connection line are at least one of electrically or mechanically connected to the interconnecting element in order to establish an electrical connection from the interior room of the housing to the outside of the housing;
  wherein the end section of the first connection line and the interconnecting element are both sealed with respect to the opening in the wall using a sealing material such that the interior room of the housing is sealed with respect to the surroundings of the housing; and
  wherein the end section of the second connection line is embedded within the sealing material and the remainder of the second connection line is not embedded in the sealing material.

3. The air spring according to claim 2, wherein the second connection line is arranged in an interior room of the air spring in order to be connected to a sensor or an actuator and wherein the first connection line is arranged such that it is connected to at least one of a control unit or a power source arranged outside the air spring housing, such that the at least one of the control unit or the power source can establish a connection in order to provide power or to transmit and receive control signals to and from the actuator and sensor, respectively via the connection arrangement.

4. The air spring according to claim 2, wherein the interconnecting element is arranged such that it is sealed using the sealing material with respect to a hole for leading through the first connection line through a wall of the air spring and wherein the sealing material seals the interior room of the air spring.

5. The air spring according to claim 2, further comprising:
a housing includes a wall,
   wherein the housing comprises a cavity and the opening in the wall is arranged at a bottom surface of the cavity;
   wherein the interconnecting element is at least partially arranged within the cavity; and
   wherein the sealing material is at least partially arranged within the cavity.

6. The air spring according to claim 2, further comprising:
a housing includes a wall,
   wherein the housing comprises a cavity and the opening in the wall is arranged in the cavity;
   wherein the interconnecting element is at least partially arranged within the cavity; and
   wherein the sealing material is at least partially arranged within the cavity.

7. Air spring according to claim 6, wherein the housing is substantially gas-tight or water-tight.

* * * * *